(12) United States Patent
Kulkarni

(10) Patent No.: US 12,442,308 B2
(45) Date of Patent: Oct. 14, 2025

(54) GAS TURBINE ENGINE WITH RELATIVE CLOCKING OF BIFURCATIONS

(71) Applicant: ROLLS-ROYCE PLC, London (GB)

(72) Inventor: Davendu Y Kulkarni, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 19/070,934

(22) Filed: Mar. 5, 2025

(65) Prior Publication Data
US 2025/0290426 A1    Sep. 18, 2025

(30) Foreign Application Priority Data
Mar. 15, 2024    (GB) .................................... 2403770

(51) Int. Cl.
| F02C 7/04 | (2006.01) |
| F01D 9/02 | (2006.01) |
| F01D 17/10 | (2006.01) |

(52) U.S. Cl.
CPC ............. *F01D 9/02* (2013.01); *F01D 17/105* (2013.01); *F02C 7/04* (2013.01); *F05D 2220/323* (2013.01); *F05D 2240/12* (2013.01); *F05D 2260/60* (2013.01); *F05D 2260/606* (2013.01)

(58) Field of Classification Search
CPC ............. F01D 5/02; F01D 17/105; F02C 7/04
See application file for complete search history.

(56) References Cited

U.S. PATENT DOCUMENTS

| 7,484,354 B2 * | 2/2009 | Stretton ................... F02C 7/32 |
| | | 60/226.1 |
| 2006/0101804 A1 | 5/2006 | Stretton |
| 2017/0145958 A1 | 5/2017 | Baralon |
| 2018/0044031 A1 | 2/2018 | Thies et al. |
| 2020/0003122 A1 * | 1/2020 | Wilshaw ................... F02C 7/20 |
| 2020/0290743 A1 | 9/2020 | Armstrong et al. |

FOREIGN PATENT DOCUMENTS

| EP | 2128023 A1 | 12/2009 |
| FR | 3064298 A1 | 9/2018 |

* cited by examiner

*Primary Examiner* — Sabbir Hasan
(74) *Attorney, Agent, or Firm* — Oliff PLC

(57) ABSTRACT

A gas turbine engine for an aircraft comprises: an air intake comprising a lip, a most upstream portion of which defining a highlight plane; an engine core comprising a compressor, a combustor, and a turbine coupled to the compressor through a shaft; a fan located upstream of the engine core and adapted to rotate about an engine main axis, the fan comprising a plurality of fan blades having a respective leading edge, trailing edge, and tip, a forward-most portion of the tip leading edge of each fan blade defining a fan inlet plane; an air intake arranged upstream of, and configured to direct air to, the fan; a plurality of fan outlet guide vanes (FOGVs) arranged downstream of the fan in a bypass duct of the gas turbine engine; and upper and lower bifurcations arranged in the bypass duct and extending along respective radial directions.

20 Claims, 3 Drawing Sheets

GAS TURBINE ENGINE WITH RELATIVE CLOCKING OF BIFURCATIONS

CROSS-REFERENCE TO RELATED APPLICATIONS

This specification is based upon and claims the benefit of priority from UK Patent Application Number 2403770.7 filed on Mar. 15, 2024, the entire contents of which are incorporated herein by reference.

BACKGROUND

1. Field of the Disclosure

The present invention relates to gas turbine engines, more particularly gas turbine engines with improved relative positioning of bifurcations to reduce flow distortions and improve fan efficiency.

2. Description of the Related Art

Gas turbine engines are used to power aircraft and generally comprises, in axial flow series from front to aft, an air intake, a fan, one or more compressors, a combustor, one or more turbines, and an exhaust nozzle. Air entering the air intake is accelerated by the fan to produce two air flows: a first air flow (core engine flow) into compressor and a second air flow (bypass flow) which passes through a bypass duct to provide propulsive thrust. Air entering the compressor is compressed, mixed with fuel and then fed into the combustor, where combustion of the air/fuel mixture occurs. The high temperature and high energy exhaust fluids are then fed to the turbine, where the energy of the fluids is converted to mechanical energy to drive the compressor in rotation by suitable interconnecting shaft.

The fan comprises a plurality of fan blades configured to rotate about a central axis of the gas turbine engine. The fan receives and pressurises air entering the air intake to produce thrust.

It is desirable to increase fan efficiency to increase thrust while reducing specific fuel consumption (SFC). It is known that fan efficiency depends, at least in part, on the circumferential flow profile at, or near, the trailing edge of the fan blades, also known as intra-stage flow profile. Flow distortions, both upstream and downstream of the fan, generally influence the intra-stage static pressure profile. For example, flow distortions are generally introduced in the fan system at upstream by the air intake and at downstream by the upper and lower bifurcations in the bypass duct. By virtue of their geometric shape and positions in the bypass duct, both upper and lower bifurcations generate large potential fields, which travel upstream to OGVs and fan, thus, generating large flow distortions. In particular, the flow distortions generated by the bifurcations interact with the Fan Outlet Guide Vanes (FOGV) aerodynamics and produce blockage effects, that reduce the FOGV flow diffusion efficiency. The increased fan and FOGV flow losses reduce the overall aerodynamic performance of the fan; thus, resulting in the increase in engine SFC.

Moreover, upstream and downstream distortions generate variable unsteady pressure distribution on the fan blades that in turn causes the variation of magnitude and phase of modal force, which may lead to increased vibratory stresses, increased HCF (High Cycle Fatigue) endurance and mechanical integrity issues that will reduce the fan blade life.

To mitigate the blockage effect of the upper and lower bifurcation it is known to design the FOGV to divert the flow in the bypass duct around the bifurcations, thereby alleviating the blockage, reducing flow distortions produced by the bifurcations, and thereby increasing the static pressure profile uniformity at the fan blade trailing edge.

The present invention aims at reducing flow distortions and increasing fan efficiency, by providing for an alternative and more effective solution to deal with flow distortions, in particular by dealing with flow distortions produced by the bifurcations downstream of the fan.

SUMMARY

Accordingly, there is provided a gas turbine engine for an aircraft according to claim 1.

In an aspect there is provided a gas turbine engine for an aircraft comprising: an air intake comprising a lip, a most upstream portion of which defining a highlight plane; an engine core comprising a compressor, a combustor, and a turbine coupled to the compressor through a shaft; a fan located upstream of the engine core and adapted to rotate about an engine main axis, the fan comprising a plurality of fan blades having a respective leading edge, trailing edge, and tip, a forward-most portion of the tip leading edge of each fan blade defining a fan inlet plane; an air intake arranged upstream of, and configured to direct air to the fan; a plurality of fan outlet guide vanes (FOGVs) arranged downstream of the fan in a bypass duct of the gas turbine engine; upper and lower bifurcations arranged in the bypass duct and extending along respective radial directions, wherein the lower bifurcation is arranged at a circumferential position corresponding to a zone of highest fan blade loading caused by flow distortions introduced by the air intake in in-flight conditions.

In the present disclosure, upstream and downstream are with respect to the direction of axial flow through the fan; and front and rear/back is with respect to the gas turbine engine, i.e. the fan being in the front and the turbine being in the rear/back of the engine.

In the present disclosure the upper and lower bifurcations, or splitters, in fan bypass duct are defined as the aerodynamically shaped fairings covering various structural links, air, oil and fuel service pipes and electrical harnesses etc., although they do not carry structural loads and contribute towards flow turning and lift generation. The upper and lower bifurcations feature a maximum thickness that is at least two and a half fan outlet guide vane (FOGV) pitches at 50% span of the leading edge of the FOGVs, with 0% span corresponding to a radially inner-most part of the FOGVs and 100% corresponding to a radially outer-most part of the FOGVs. The pitch is defined as the tangential distance between the leading edges of two adjacent FOGVs at 50% span. Where the tangential distances between adjacent FOGVs are not the same, an average distance is considered. In other words, the upper bifurcation at its maximum thickness span, when seen from the rear of the engine, may be seen as "covering" at least two and a half FOGVs; similarly, the lower bifurcation at its maximum thickness span, when seen from the rear of the engine, may be seen as "covering" at least two and a half FOGVs. The upper bifurcation and the lower bifurcation do not need to have the same maximum thickness and therefore may "cover" a different number of FOGVs. For example, the upper bifurcation may be thicker than the lower bifurcation and may cover a greater number of FOGVs, for example at least three, four, or five FOGVs. In other embodiments, the lower bifurcation may be thicker than the upper bifurcation and may cover a greater number of FOGVs, for example at least three, four, or five FOGVs.

The present disclosure is at least partly based on the realisation that the flow distortions generated by the lower bifurcation and travelling upstream towards the fan can be used to compensate for downstream-travelling distortions caused by the intake.

The present inventor has realised that, for example in an under-wing mounted engine configuration, the wing induces an upwash flow entering the intake, which in turn produces 1EO (first engine order) circumferential flow distortions upstream of the fan.

Downstream of the FOGVs, the large potential fields of upper and lower bifurcations generate 2EO (second engine order) circumferential flow distortions that are largely in-phase with the intake residual distortion.

In under-wing mounted engines the wing upwash is produced in all nominal in-flight operating conditions, that is during all high forward speed flight conditions between maximum take-off from ground to the landing touch-down. At all high forward speed conditions, the air streamtube that contains the air entering the air intake is well aligned to the air intake and hence the flow distortions upstream of the fan caused by wing upwash can be considered constant. Moreover, the present inventor has realised that in in-flight conditions the flow distortion upstream of the fan caused by the wing upwash is unaffected by crosswind, which plays a secondary-order role in generating flow distortions in the air streamtube upstream of the fan. Therefore, for all practical design purposes, crosswind and the effect thereof on flow distortion just upstream of the fan in flight conditions can be disregarded, and the intake upwash distortion profile and its relative circumferential position with respect to bifurcations can be considered as fixed in flight conditions and determined by the wing upwash only.

Due to the wing up-wash in all in-flight conditions, the fan experiences a non-uniform loading, in particular lowest loading (and therefore highest efficiency) at the top dead centre (TDC), 0°, or 12 o'clock, position, and highest loading (and therefore lowest efficiency) at the bottom dead centre (BDC), 180°, or 6 o'clock position. In fact, the present inventor has realised that the position of lowest loading is not exactly at TDC because of the fan rotation: for a fan rotating clockwise when seen from the front, the area of lowest loading is arranged before (considering a clockwise direction) the TDC, at about 11 o'clock position, or −30°; similarly, the position of highest loading is arranged before the BDC, at about 5 o'clock position, or 150°. Conversely, for a fan rotating counterclockwise when seen from the front, the position of lowest loading is arranged after (again considering a clockwise direction) the TDC, at about 1 o'clock position, or +30°; similarly, the position of highest loading is arranged after the BDC, at about 7 o'clock position, or 210°.

In detail, the upstream flow distortions affect the fan aerodynamics of an axisymmetric fan operating in asymmetric flow conditions without any mitigation in place. A fan blade rotating through flow distortions experiences a variation of effective blade speed between the left and right halves of the annulus, which causes the variation of both the pressure ratio across the fan blades and the magnitude and direction of the inlet relative velocity at the fan blade leading edge. The variation of relative velocity magnitude and direction causes an incidence angle variation, which in turn leads to a blade lift variation and hence the variation of work done by fan blades in different parts of the annulus.

It is important to note that the annular, or circumferential, positions of lowest fan blade loading (corresponding to a peak of static pressure and a minimum of effective fan blade speed) and highest fan blade loading (corresponding to a minimum of static pressure and a peak of effective fan blade speed) depends on the rotational direction of the fan, but not on how the engine, or the aircraft on to which the engine is mounted, is operated: for example, the circumferential positions of highest and lowest fan blade loading is independent from the fan rotational speed, aircraft speed and altitude, environment ambient temperature and pressure, and/or flight conditions. The annular positions of the peak and minimum of static pressure may depend on the air intake geometry, for example the lip scarf angle and the lip thickness. Generally, the peak and minimum of static pressure are arranged at opposite circumferential positions. On the contrary, the static pressure distortion strength may vary depending on operational parameters of the aircraft which the engine is mounted onto: for example, at cruise condition the upwash angle is limited to about 4° and therefore the static pressure distortion strength is lower than that at the end-of-runway (EOR) condition, wherein the upwash angle can be as high as 15°-18°.

While the annular position of the upper bifurcation is substantially set by the pylon which the engine is mounted to, the present inventor has realised that the lower bifurcation can be arranged in a circumferential position corresponding to the position of highest fan blade loading (or highest effective blade speed) caused by the flow distortions introduced by the air intake, such that upstream travelling distortions caused by the lower bifurcation can pass through the FOGVs and counter the intake distortions, thereby increasing fan blade loading uniformity. In other words, the lower bifurcation produces a 1EO circumferential static pressure variation at the fan blade trailing edge having a static pressure phase substantially opposite to that caused by the intake distortions. This intra-stage flow field, produced by means of the upstream travelling, lower bifurcation-induced distortions, counters the intake distortions, generates a favourable pressure ratio for all fan blades, thereby increasing the fan blade efficiency at all annular positions. This increases the overall fan rotor and fan stage efficiency and reduces the 1EO fan blade forced response caused by asymmetric flow.

To maximise countering of the intake distortions at the annular position of highest fan blade loading by means of the upstream travelling, lower bifurcation-induced distortions, the FOGVs may be designed to allow lower bifurcation-induced distortions of controlled magnitude to pass through. To this purpose, any suitable cyclic variation of FOGV inlet and exit angles may be used by optimising FOGV stagger and camber angles, and number of FOGV types.

The present invention is particularly beneficial for gas turbine engines with a short intake, as the shorter the intake the greater the distortions caused by the intake. Air intakes are generally characterised by the ratio L/D, wherein L is the intake length defined as axial distance along the engine main axis between a highlight plane and a fan inlet plane.

The intake comprises a lip, a most upstream portion of which defines the highlight plane.

The fan blades have a respective leading edge, trailing edge, and tip, a forward-most portion of the tip leading edge of each fan blade defining the fan inlet plane. In embodiments, the air intake may have a ratio L/D less than 0.70, preferably less than 0.50, more preferably less than 0.45, even more preferably less than 0.40. The ratio L/D may be greater than 0.25, preferably greater than 0.30. For example, the ratio L/D may be in a range of from 0.25 to 0.70, or in a range of from 0.25 to 0.60, or in a range of from 0.25 to 0.50, or in a range of from 0.25 to 0.45.

In embodiments, the gas turbine engine may be an underwing mounted, clockwise-rotating gas turbine engine and the lower bifurcation may be arranged at a rotation angle relative to the upper bifurcation in a range of from 120° to 170°, preferably in the range of from 130° to 165°, preferably in the range of from 135° to 165°, preferably in the range of from 140° to 160°.

In embodiments, the gas turbine engine may be an underwing mounted, counterclockwise rotating gas turbine engine and the lower bifurcation may be arranged at a rotation angle relative to the upper bifurcation in a range of from 190° to 240°, preferably in the range of from 190° to 230°, preferably in the range of from 195° to 225°, preferably in the range of from 200° to 220°.

In embodiments, the gas turbine engine may be a fuselage mounted gas turbine engine, or an over-wing mounted engine.

In embodiments, the gas turbine engine may have more than two bypass bifurcations having different designs, shapes and sizes.

In embodiments, the gas turbine engine may have more than two bifurcations in core compressor ducts having different designs, shapes and sizes.

The upper bifurcation may be arranged in a circumferential position corresponding to the top dead centre (TDC).

The fan may have a fan diameter greater than 210 cm, preferably greater than 215 cm, preferably greater than 220 cm.

The fan may have fan diameter less than 400 cm, preferably less than 380 cm, preferably less than 360 cm.

The fan may have a fan diameter greater than 120 cm, preferably greater than 130 cm, preferably greater than 140 cm.

The fan may have fan diameter less than 160 cm, preferably less than 150 cm, preferably less than 145 cm.

The gas turbine engine may comprise a gearbox configured to receive input from the shaft and output drive to the fan, so as to drive the fan at a lower speed than the shaft.

The gearbox may have a gearbox ratio greater than 3.0, preferably greater than 3.1, preferably greater than 3.2.

The turbine may be a first turbine, the compressor may be a first compressor, and the shaft may be a first shaft. The engine core may further comprise a second turbine, a second compressor, and a second shaft connecting the second turbine to the second compressor; and the second turbine, second compressor, and second shaft may be arranged to rotate at a higher rotational speed than the first core shaft.

The lower bifurcation may be arranged at a circumferential position corresponding to a position of highest fan blade loading caused by flow distortions introduced by the air intake at cruise conditions.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges, for example the gearbox may be a "compound star" gearbox having a ratio greater than 4.2.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The respective rows of rotor blades and stator vanes may be axially offset from each other. In each stage, the row of rotor blades may be arranged downstream from the respective row of stator vanes. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 200 cm, 210 cm, 215 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches), or 420 cm (around 165 inches). The fan diameter may be less than 420 cm (around 165 inches), 410 cm (around 160 inches), 400 cm, 390 cm (around 155 inches), or 380 cm (around 150 inches). The fan diameter may be in an inclusive range bounded by any two of the values in the previous two sentences (i.e. the values may form upper or lower bounds), for example in the range of from 200 cm to 210 cm, or 210 cm to 240 cm, or 250 cm to 280 cm, or 320 cm to 380 cm.

The rotational speed of the fan may vary in use. Generally, the rotational speed is lower for fans with a higher diameter. Purely by way of non-limitative example, the rotational speed of the fan at cruise conditions may be less than 2600 rpm, for example less than 2500 rpm, or less than 2300 rpm. Purely by way of further non-limitative example, the rotational speed of the fan at cruise conditions for an engine having a fan diameter in the range of from 200 cm to 300 cm (for example 210 cm to 290 cm, or 240 cm to 280 cm, or 250 cm to 270 cm) may be in the range of from 1700 rpm to 2600 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio (BPR), where the bypass ratio is defined as the ratio of the mass flow rate of the flow through the bypass duct to the mass flow rate of the flow through the core. In some arrangements the bypass ratio at cruise conditions may be greater than (or on the order of) any of the following: 10, 10.5, 11, 11.1, 11.2, 11.3, 11.4, 11.5, 11.6, 11.7, 11.8, 11.9, 12, 12.5, 13, 13.5, 14, 14.5, 15, 15.5, 16, 16.5, 17, 17.5, 18, 18.5, 19, 19.5 or 20. The bypass ratio at cruise conditions may be in an inclusive range bounded by any two of the values in the previous sentence (i.e. the values may form upper or lower bounds), for example in the range of from 10 to 16, or 12 to 16, 13 to 15, or 10 to 12, or 12 to 14, or 13 to 14. The bypass duct may be substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise conditions may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 99 $Nkg^{-1}$ s, 98 $Nkg^{-1}$ s, 97 $Nkg^{-1}$ s, 96 $Nkg^{-1}$ s, 95 $Nkg^{-1}$ s, 94 $Nkg^{-1}$ s, 93 $Nkg^{-1}$ s, 92 $Nkg^{-1}$ s, 91 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 100 $Nkg^{-1}$ s, or 92 $Nkg^{-1}$ s to 98 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 130 kN to 145 kN, or 155 kN to 170 kN, or 330 kN to 420 kN, or 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise conditions, the TET may be at least (or on the order of) any of the following: 1400K, 1450K, 1500K, 1520K, 1530K, 1540K, 1550K, 1600K or 1650K. The TET at cruise conditions may be in an inclusive range bounded by any two of the values in the previous sentence (i.e. the values may form upper or lower bounds), for example 1530K to 1600K. The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1700K to 1800K, or 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent). Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only with reference to the accompanying drawings, in which.

DETAILED DESCRIPTION OF THE DISCLOSURE

Figure 1:
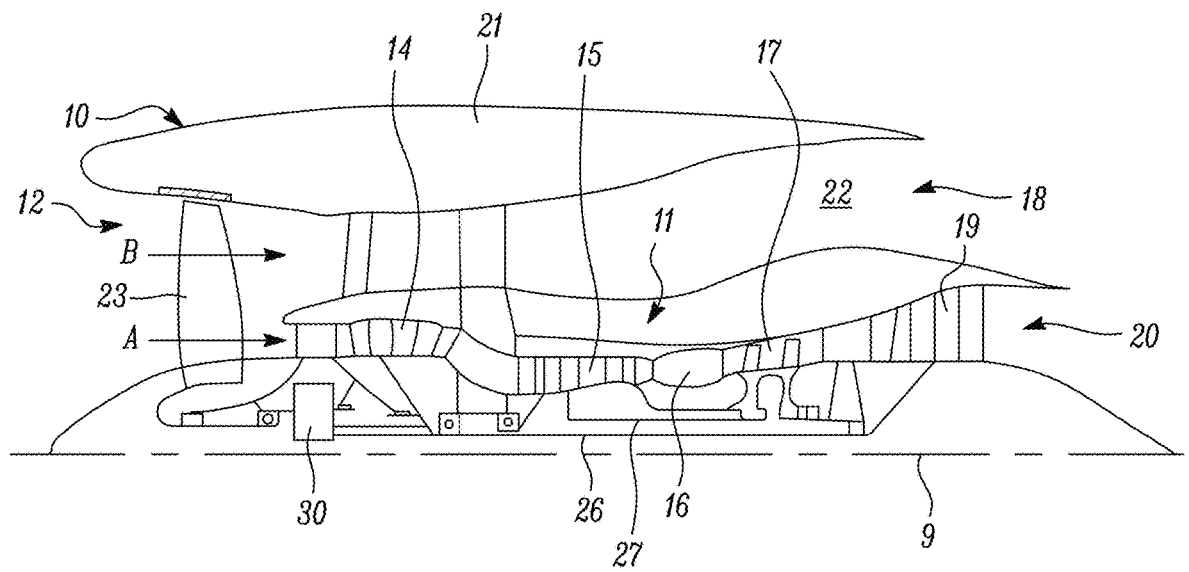
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a first shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a second shaft 27. The fan 23 generally provides the majority of the propulsive thrust. The epicyclic gearbox 30 is a reduction gearbox.

Figure 2:
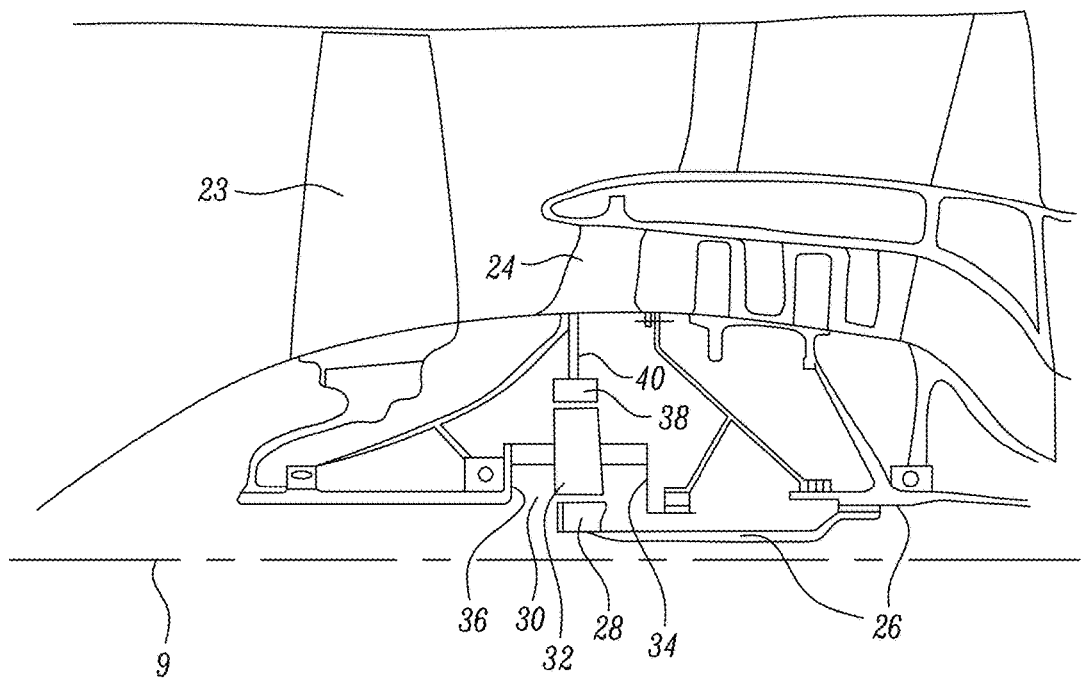
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the first shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the first shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
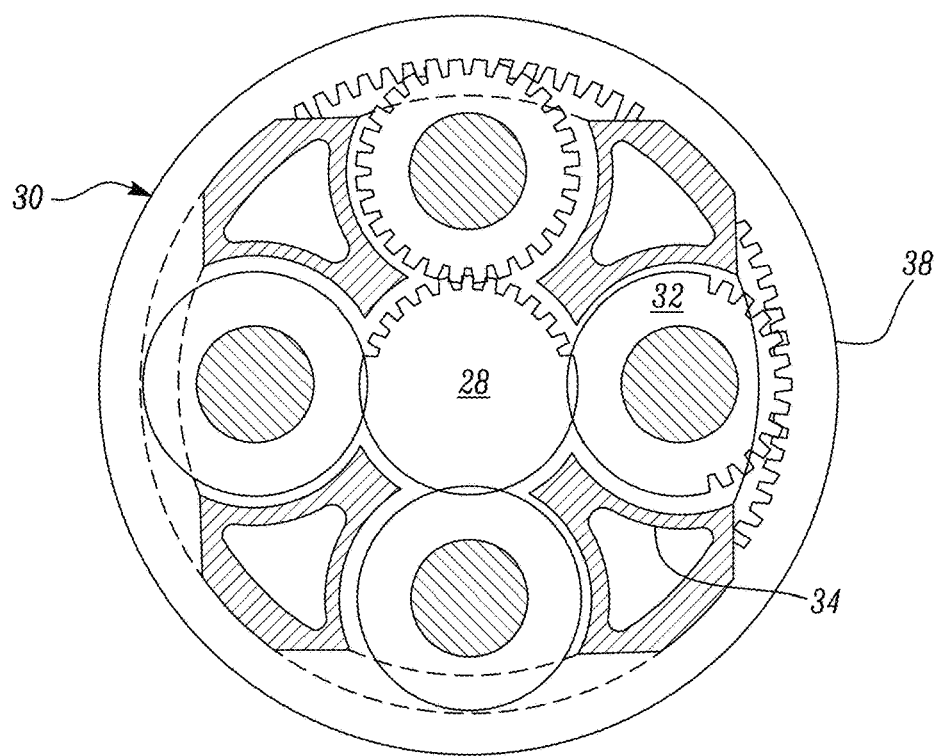
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of alternative example, the epicyclic gearbox 30 may be a two-stage star arrangement, wherein the sun gear of the first stage is coupled to the first shaft 26, the sun gear of the second stage is coupled to the ring gear of the first stage, and the fan is coupled to the ring gear of the second stage via suitable linkages. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. In some arrangements, the gas turbine engine 10 may not comprise a gearbox 30.

The geometry of the gas turbine engine 10, and components thereof, is defined by a conventional axis system, comprising an axial direction (which is aligned with the principal rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
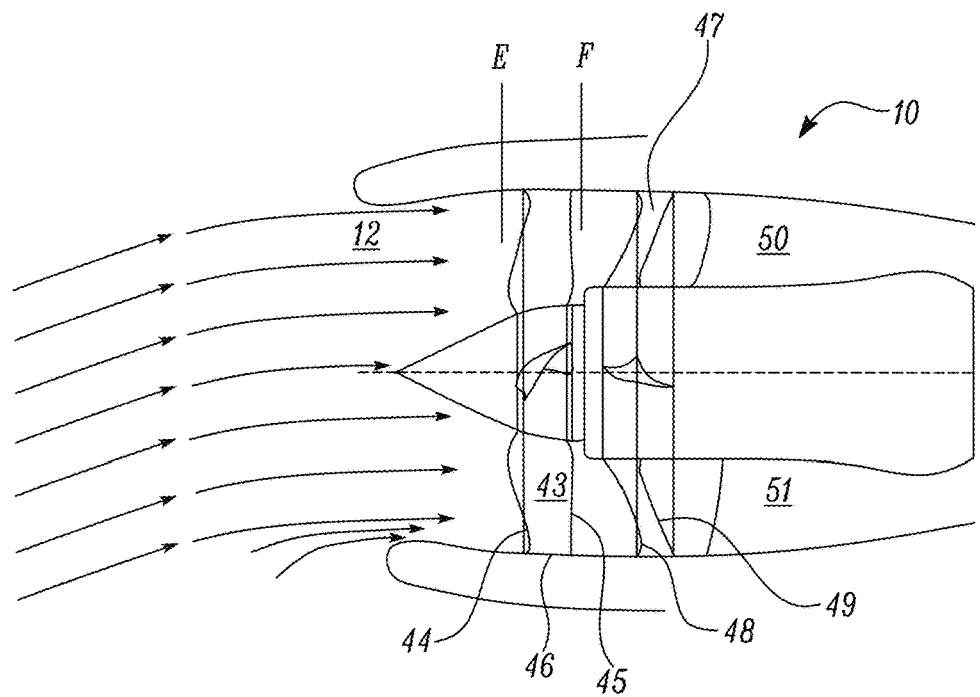
FIG. 4 is a sectional side view of a gas turbine engine in a typical under/over-wing mounted configuration.

FIG. 4 illustrates the exemplary gas turbine engine 10 of FIG. 1 with a drooped intake 12 in an under/over-wing mounted configuration in flight conditions. The fan 23 comprises a plurality of fan blades 43, each fan blade 43 including a leading edge 44, a trailing edge 45, and a tip 46. A forward-most portion of the tip leading edge of the fan blades 43 defines a fan inlet plane at an axial position identified by the letter E. A rear-most portion of the tip trailing edge of the fan blades 43 defines a fan exit plane at an axial position identified by the letter F. The wing (not illustrated) produces an upwash flow entering the intake 12, which in turn produces a first engine order (1EO) circumferential flow distortions at the fan inlet plane. As explained before, the effect of crosswind on the flow distortions at the fan inlet plane in flight conditions is negligible and can be ignored.

In other words, each of the fan blades 43 of fan 23 experiences non-uniform loading as it passes through the 1EO circumferential flow distortions produced by the intake 12, in particular lower loading in the upper half of the annulus and higher loading in the lower half of the annulus in FIG. 4.

Moreover, the fan blade 43 rotating through the flow distortions caused by the wing upwash experiences a variation of the effective blade speed between different parts of the annulus, in particular between the left and right halves of the annulus (when seen from the front of the engine), which in turn causes the variation of both the total pressure ratio and the magnitude and direction of inlet relative velocity, and ultimately the variation of work done by the fan blade 43 in different parts of the annulus. As a consequence, for the gas turbine engine 10 with the fan 23 rotating clockwise when seen from the front, the annular position of highest loading is arranged before (considering a clockwise direction) the bottom dead centre (or) 180°, in a circumferential position corresponding to a range of from 120° to 170°.

For gas turbine engines with the fan rotating counter-clockwise when seen from the front, the positions of lowest and highest loading are arranged after (again considering a clockwise direction) the top dead centre (or) 0° and the bottom dead centre, respectively. In such embodiments, the position of highest loading may be arranged in a circumferential position corresponding to a range of from 190° to 240°, or from 190° to 230°, or from 195° to 225°, or from 200° to 220°, for example at about 210°.

The gas turbine engine 10 includes a row of fan outlet guide vanes (FOGVs) 47 arranged downstream of the fan 23 in the bypass duct 22. The FOGVs 47 each comprise a respective leading edge 48 and a trailing edge 49.

Downstream of the FOGVs 47 the gas turbine engine 10 comprises an upper bifurcation 50 and a lower bifurcation 51. In the illustrated embodiment of FIG. 5a the gas turbine engine 10 is illustrated in an under-wing mounted configuration and the upper bifurcation 50 is arranged at the top dead centre and proximal to a wing 52. In alternative, non-illustrated embodiments, the upper bifurcation may be arranged differently, depending on the structural mounting arrangement of the engine on the wing or to the fuselage.

The lower bifurcation 51 is arranged distal to the wing 52.

The lower bifurcation 51 is arranged rotated with respect to the bottom dead centre, in a circumferential position corresponding to the circumferential position of highest fan blade loading caused by the flow distortions introduced by the air intake in flight conditions, for example at cruise conditions.

In other words, the lower bifurcation 51 is arranged radially along a direction 53 at a rotation angle α to a direction 54 defined by the upper bifurcation 50. In the illustrated embodiment, the direction 54 is vertical and passes through the top dead centre and the bottom dead centre. In the embodiment illustrated in FIG. 5*a*, the fan rotates along a clockwise direction 60 when seen from the front and accordingly the lower bifurcation 51 is arranged in a circumferential position corresponding to a rotation angle α in the range of from 120° to 170°. In embodiments, the lower bifurcation 51 is arranged in a circumferential position corresponding to a rotation angle α in the range of from 130° to 165°, or in a range of from 135° to 165°, or in a range of from 140° to 160°, for example at about 150°, to match the annular position of the position of highest fan blade loading.

Figure 5A:
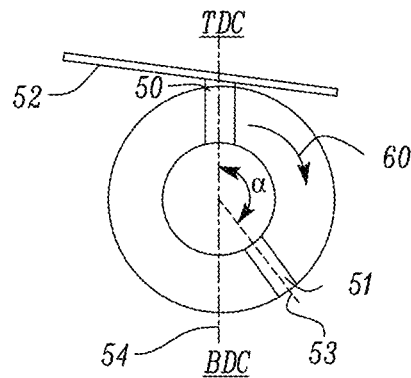
FIGS. 5a and 5b are a schematic front view of the gas turbine engine of FIG. 4 in an under-wing configuration showing the upper and lower bifurcation circumferential positions with the fan rotating clockwise and counterclockwise, respectively.
Figure 5B:
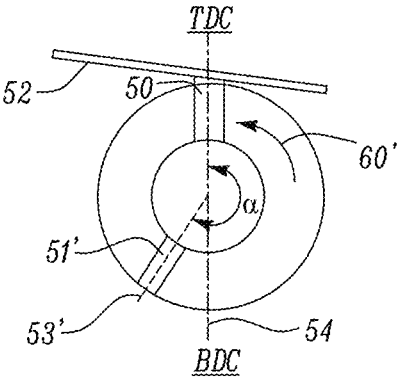

FIG. 5*b* illustrates an embodiment that differs from the embodiment of FIG. 5*a* by the rotational direction 60' of the fan 23 and the position of the lower bifurcation 51'. In detail, the fan rotates counterclockwise when seen from the front and the lower bifurcation 51' is arranged in a circumferential position corresponding to a rotation angle α in the range of from 190° to 240°, or from 190° to 230°, or from 195° to 225°, or from 200° to 220°, for example at about 210°, corresponding to the annular position of the position of highest loading of the fan blades 43.

In further non-illustrated embodiments where the gas turbine engine is mounted to the fuselage, the upper bifurcation (i.e. the bifurcation proximal to the fuselage) may not extend along a vertical direction; however, the rotation angle α at which the lower bifurcation (i.e. the bifurcation at a distal position to the fuselage) is arranged relative to the upper bifurcation may be in the same, or similar ranges as described above.

The upper and lower bifurcations 50, 51, 51' produce distortions travelling upstream towards the fan 23. The FOGVs may be configured to promote the pressure distortions produced by the lower bifurcation 51, 51' to pass through. To this purpose, the FOGVs 47 may feature suitable stagger and camber angles, and number of blade types to achieve 0-pk amplitude of lower bifurcation distortions with opposite phase of 0-pk amplitude of intake distortions at the fan blade trailing edge 45.

In embodiments, the FOGVs 47 may be configured to mask, for example fully mask, the pressure distortions produced by the upper bifurcation 50, by using any suitable number of types of FOGVs, and any suitable stagger and camber angles.

This produces a 1EO circumferential static pressure variation at the fan exit plane having a pressure distortion phase opposite, or approximately opposite, to that of the intake distortion. This intentionally produced fan exit pressure field effectively counters the intake distortions; thus regaining a significant portion of fan stage efficiency and reducing the fan blade 1EO forced response caused by asymmetric flows.

Figure 6:
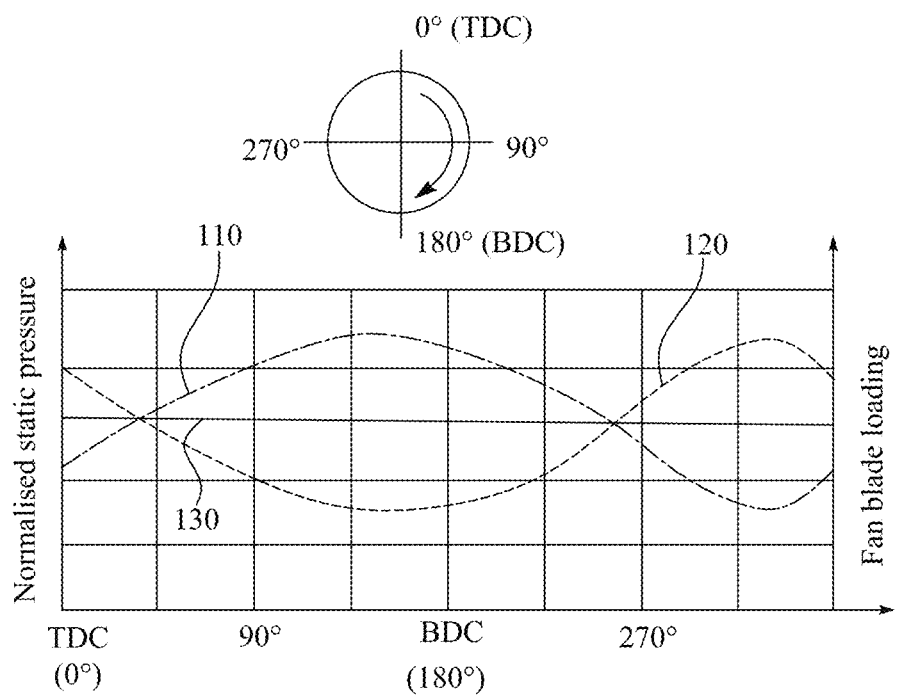
FIG. 6 is a schematic graph showing the circumferential variations of normalised static pressure at different axial positions and the fan blade loading of the gas turbine engine of FIG. 4.

This is illustrated in FIG. 6, wherein, for the gas turbine engine 10 rotating clockwise of FIG. 5*a*, the normalised static pressure resulting from the upstream-travelling distortions introduced by the bifurcations 50, 51 at the fan exit plane (position F in FIG. 4) is illustrated by dash-dot line 110, the normalised static pressure of the downstream-travelling intake distortions at the fan inlet plane (position E in FIG. 4) is illustrated by dashed line 120, and the effective circumferential variation of fan blade loading resulting from the combination of the two within the fan 23 is illustrated by solid line 130. All of the normalised static pressures and fan blade loading are illustrated against the circumferential position.

The effective fan blade loading is more uniform along the annulus than the fan blade loading produced by the intake distortions only, thereby increasing fan efficiency and reducing 1EO fan blade forced response and vibratory stresses.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

I claim:

1. A gas turbine engine for an aircraft comprising:
   an air intake comprising a lip, a most upstream portion of which defining a highlight plane,
   an engine core comprising a compressor, a combustor, and a turbine coupled to the compressor through a shaft;
   a fan located upstream of the engine core and adapted to rotate about an engine main axis, the fan comprising a plurality of fan blades having a respective leading edge, trailing edge, and tip, a forward-most portion of the tip leading edge of each fan blade defining a fan inlet plane;
   the air intake arranged upstream of, and configured to direct air to, the fan;
   a plurality of fan outlet guide vanes (FOGVs) arranged downstream of the fan in a bypass duct of the gas turbine engine; and
   upper and lower bifurcations arranged in the bypass duct and extending along respective radial directions;
   wherein the lower bifurcation is arranged at a circumferential position corresponding to a position of highest fan blade loading caused by flow distortions introduced by the air intake in in-flight conditions.

2. The gas turbine engine according to claim 1, wherein the fan has a fan diameter D, and the air intake has a length L measured along the engine main axis between the highlight plane and the fan inlet plane, and
   wherein the ratio L/D is less than 0.70.

3. The gas turbine engine according to claim 2, wherein the ratio L/D is less than 0.50.

4. The gas turbine engine according to claim 2, wherein the ratio L/D is less than 0.45.

5. The gas turbine engine according to claim 2, wherein the ratio L/D is less than 0.40.

6. The gas turbine engine according to claim 2, wherein the ratio L/D is greater than 0.25, preferably greater than 0.30.

7. The gas turbine engine according to claim 1, wherein the gas turbine engine is an under-wing mounted gas turbine engine and has a clockwise rotating fan, the lower bifurcation being arranged at a rotation angle α relative to the upper bifurcation in a range of from 120° to 170°.

8. The gas turbine engine according to claim 7, wherein the rotation angle α is in a range of from 130° to 165°.

9. The gas turbine engine according to claim 1, wherein the gas turbine engine is an under-wing mounted gas turbine engine and has a counterclockwise rotating fan, the lower bifurcation being arranged at a rotation angle α relative to the upper bifurcation in a range of from 190° to 240°.

10. The gas turbine engine according to claim 9, wherein the rotation angle α is in a range of from 195° to 225°.

11. The gas turbine engine according to claim 1, wherein the upper bifurcation is arranged in a circumferential position corresponding to the top dead centre (TDC).

12. The gas turbine engine according to claim 1, wherein the fan has a fan diameter greater than 120 cm.

13. The gas turbine engine according to claim 12, wherein the fan has a fan diameter less than 400 cm.

14. The gas turbine engine according to claim 12, comprising a gearbox configured to receive input from the shaft and output drive to the fan, so as to drive the fan at a lower speed than the shaft.

15. The gas turbine engine according to claim 14, wherein the gearbox has a gearbox ratio greater than 3.0.

16. The gas turbine engine according to claim 14, wherein the gearbox has a gearbox ratio greater than 3.3.

17. The gas turbine engine according to claim 1, wherein the turbine is a first turbine, the compressor is a first compressor, and the shaft is a first shaft;
the engine core further comprises a second turbine, a second compressor, and a second shaft connecting the second turbine to the second compressor; and
the second turbine, second compressor, and second shaft are arranged to rotate at a higher rotational speed than the first core shaft.

18. The gas turbine engine according to claim 1, wherein the lower bifurcation is arranged at a circumferential position corresponding to a position of highest fan blade loading caused by flow distortions introduced by the air intake at cruise conditions.

19. The gas turbine engine according to claim 7, wherein the rotation angle α is in a range of from 140° to 160°.

20. The gas turbine engine according to claim 9, wherein the rotation angle α is in a range of from 200° to 220°.

* * * * *